(12) United States Patent
Wang et al.

(10) Patent No.: US 10,899,858 B2
(45) Date of Patent: Jan. 26, 2021

(54) POLYETHYLENE MATERIAL AND APPLICATION THEREOF

(71) Applicants: CHINA PETROLEUM & CHEMICAL CORPORATION, Beijing (CN); ZHEJIANG UNIVERSITY, Zhejiang (CN)

(72) Inventors: Jingdai Wang, Zhejiang (CN); Wenqing Wu, Tianjin (CN); Yongrong Yang, Zhejiang (CN); Guodong Han, Tianjin (CN); Xiaofei Wang, Tianjin (CN); Yuhui Cui, Tianjin (CN); Binbo Jiang, Zhejiang (CN); Zhengliang Huang, Tianjin (CN); Jingyuan Sun, Zhejiang (CN); Xiaobo Hu, Zhejiang (CN); Xiaoqiang Fan, Zhejiang (CN); Zuwei Liao, Zhejiang (CN); Yao Yang, Zhejiang (CN)

(73) Assignees: CHINA PETROLEUM & CHEMICAL CORPORATION, Beijing (CN); ZHEJIANG UNIVERSITY, Zhejiang (CN)

(*) Notice: Subject to any disclaimer, the term of this patent is extended or adjusted under 35 U.S.C. 154(b) by 62 days.

(21) Appl. No.: 16/095,670

(22) PCT Filed: Apr. 22, 2016

(86) PCT No.: PCT/CN2016/080041
§ 371 (c)(1),
(2) Date: Oct. 22, 2018

(87) PCT Pub. No.: WO2017/181424
PCT Pub. Date: Oct. 26, 2017

(65) Prior Publication Data
US 2019/0127501 A1    May 2, 2019

(51) Int. Cl.
| | | |
|---|---|---|
| C08F 210/02 | (2006.01) |
| C08F 210/14 | (2006.01) |
| C08F 2/01 | (2006.01) |
| C08K 5/01 | (2006.01) |
| C08L 23/08 | (2006.01) |
| C08F 110/02 | (2006.01) |

(52) U.S. Cl.
CPC .............. *C08F 210/02* (2013.01); *C08F 2/01* (2013.01); *C08F 210/14* (2013.01); *C08K 5/01* (2013.01);
(Continued)

(58) Field of Classification Search
None
See application file for complete search history.

(56) References Cited

U.S. PATENT DOCUMENTS 4,701,432 A    10/1987 Welborn, Jr.
6,479,590 B1 *  11/2002 Ikeda ................ C08F 255/00
(Continued)

FOREIGN PATENT DOCUMENTS

CN    1118361 A    3/1996
CN    102307915 A    1/2012
(Continued)

OTHER PUBLICATIONS

JP-2000212341-A, Aug. 2000, Derwent AB. (Year: 2000).*

*Primary Examiner* — Satya B Sastri
(74) *Attorney, Agent, or Firm* — Novick, Kim & Lee, PLLC; Allen Xue

(57) ABSTRACT

Provided is a polyethylene material and application thereof. A density distribution of the polyethylene material is in a range of 0.880 g/cm³-0.960 g/cm³. An amount of a fraction at a temperature of 40° C. obtained by conducting temperature rising elution fractionation on the polyethylene material is in a range of 9.0 wt %-40.0 wt %, preferably in a range of 10.0 wt %-25.0 wt %, more preferably in a range of 9.9 wt %-20.0 wt %. A melting temperature of the polyethylene
(Continued)

material is 110° C.-135° C., preferably 116° C.-130° C. The polyethylene material provided by the present application has distinctly improved amount of medium/low-molecular-weight fractions and high-degree-branching fractions, as well as relatively high-molecular-weight fractions which are highly branched. The polyethylene material thus has a relative high melting temperature.

29 Claims, 1 Drawing Sheet

(52) U.S. Cl.
CPC ......... *C08L 23/0815* (2013.01); *C08F 110/02* (2013.01); *C08F 2500/01* (2013.01); *C08F 2500/04* (2013.01); *C08F 2500/08* (2013.01); *C08F 2500/12* (2013.01); *C08L 2203/162* (2013.01)

(56) References Cited

U.S. PATENT DOCUMENTS

| | | | |
|---|---|---|---|
| 6,642,313 B1* | 11/2003 | Kazakov | C08L 23/0815 525/191 |
| 2009/0306299 A1* | 12/2009 | Kipke | C08F 10/00 525/240 |
| 2013/0253150 A1* | 9/2013 | Lu | C08F 4/6055 526/90 |

FOREIGN PATENT DOCUMENTS

| | | |
|---|---|---|
| CN | 103864970 A | 6/2014 |
| CN | 104761788 A | 7/2015 |
| CN | 105732870 A | 7/2016 |
| JP | 2000212341 A * | 8/2000 |

* cited by examiner

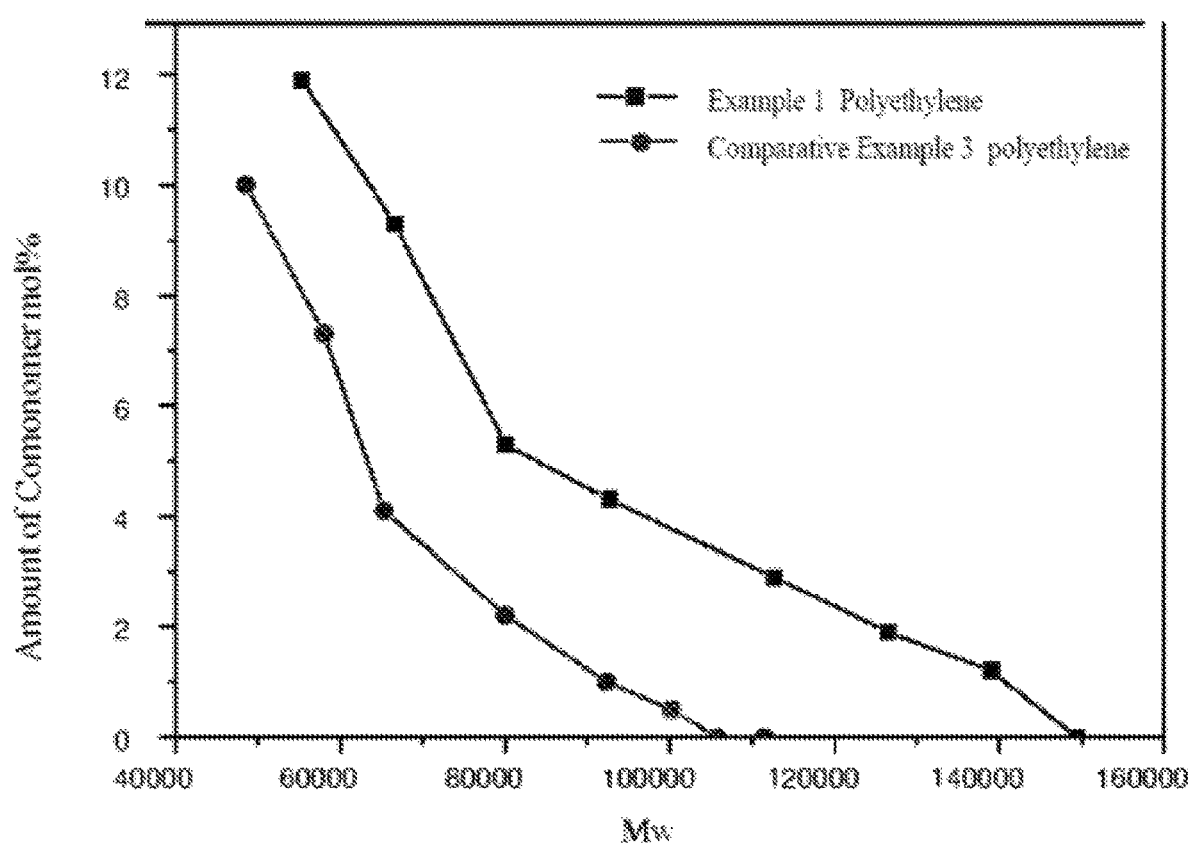

POLYETHYLENE MATERIAL AND APPLICATION THEREOF

FIELD OF THE INVENTION

The present application relates to the technical field of polyethylene, and in particular to a new polyethylene polymer and application thereof.

BACKGROUND OF THE INVENTION

Currently, polyethylene is the most widely used and most produced olefin polymer. It is a general-purpose thermoplastic with various structures and properties, and is one of the primary types of synthetic resins. Polyethylene can be classified into many types. There are, for example, high-density polyethylene (HDPE, having a density of 0.940 g/cm$^3$-0.960 g/cm$^3$), medium-density polyethylene (MDPE, having a density of 0.926 g/cm$^3$-0.940 g/cm$^3$), low-density polyethylene (LDPE, having a density of 0.88 g/cm$^3$-0.926 g/cm$^3$), linear low-density polyethylene (LLDPE, having a density of 0.915 g/cm$^3$-0.926 g/cm$^3$), and very-low-density polyethylene (VLDPE, having a density of 0.890 g/cm$^3$-0.915 g/cm$^3$). Polymerization processes for producing polyethylene mainly include: slurry polymerization, solution polymerization, and gas phase polymerization, among which gas phase polymerization in fluidized bed reactors is capable of producing about ⅓ of the world's total polyethylene, and producing nearly ½ of the total polyethylene in China. Compared with other polymerization processes, the gas phase polymerization has advantages of being simple, short, and flexible, being operable under moderate conditions, and being capable of realizing easy solvent recovery and easy grade transition (i.e. grade switch-over of polyethylene product).

Molecular weight and molecular weight distribution of polyethylene have great influences on properties of polyethylene. High-molecular-weight polyethylene has good physical mechanical properties, but is not easy to process. Low-molecular-weight polyethylene exhibits good rheological properties when being processed, but physical mechanical properties thereof are poor. In the past, a commonly used method for regulating the molecular weight and molecular weight distribution of polyethylene is to change the partial pressure of hydrogen in a reaction system. Nowadays the regulation of polyethylene production is no longer limited to this method. The addition of an α-olefin comonomer can also change the molecular weight and molecular weight distribution of polyethylene. Meanwhile, the α-olefin comonomer can change structures of side chains of polyethylene, and can therefore regulate the physical property and machinability of polyethylene.

European patent EP 0038119 relates to a terpolymer of propylene, ethylene and another α-olefin, the total amount of ethylene and α-olefin in the terpolymer being in the range set by the following equation: ethylene % by weight+A. α-olefin % by weight=3.0% to 5.0% by weight, wherein when the α-olefin is hexene-1, A is 0.455. Terpolymers with properties falling outside this range are suitable for producing films. Patent application WO2006/002778 relates to pipe systems made from copolymers of propylene/ethylene, and α-olefins, wherein the amount of ethylene ranges from 0% to 9% by moles, preferably from 1% to 7% by moles, and the amount of hexene-1 ranges from 0.2% to 5% by moles. When the amounts of ethylene and hexene-1 are selected from these ranges, a polymer with improved properties suitable for use of films can be obtained.

Chinese patent CN1384844 relates to copolymers of ethylene with $C_3$-$C_{12}$ α-olefins. The copolymers have a molecular weight distribution Mw/Mn of <10, a density of 0.85 g/cm$^3$ to 0.95 g/cm$^3$, a proportion of 1 to 40% by weight and a molar mass Mn of more than 150000 g/mol and the breadth index of the composition distribution of the comonomer is more than 70%. The polymers can be used for fibers, molded articles, films or polymer mixtures.

Although the synthesis process of ethylene copolymers by using α-olefins as comonomers has produced various types of polyethylene, there are still many countries throughout the world which do not have and are not capable of having the equipment for large-scale production of ethylene/α-olefin copolymers. A type of polyethylene with excellent properties is therefore still desirable in current and future market especially in regions lacking α-olefin resources. More importantly, there is still an increasing demand for a type of polyethylene with special structure and composition characteristics. It is therefore of great significance to reinforce the research and development of olefin-copolymerized polyethylene products.

SUMMARY OF THE INVENTION

One of the objectives of the present application is to provide a new type of polyethylene polymer which can be prepared in a single reactor by alternately conducting olefin copolymerization and olefin homopolymerization. The new type of polyethylene polymer may be a polyethylene product covering all densities of polyethylene from very-low-density polyethylene (VLDPF) to high-density polyethylene (HDPE). Low-molecular-weight fractions of the polyethylene are large in amount and are highly branched, and the polyethylene has very good physical properties such as good malleability.

The present application provides a polyethylene material. A density distribution of the polyethylene material is in a range of 0.880 g/cm$^3$-0.960 g/cm$^3$. An amount of a fraction at a temperature of 40° C., as determined by conducting temperature rising elution fractionation on the polyethylene material, is in a range of 9.0 wt %-40.0 wt %, preferably in a range of 10.0 wt %-25.0 wt %, more preferably in a range of 9.9 wt %-20.0 wt %. A melting temperature of the polyethylene material is in a range of 110° C.-135° C., preferably in a range of 116° C.-130° C., more preferably in a range of 119° C.-128° C.

The amount of the fraction at 40° C. is for example 9.0 wt %, 9.5 wt %, 9.9 wt %, 10.0 wt %, 11.0 wt %, 12.0 wt %, 13.0 wt %, 14.0 wt %, 15.0 wt %, 16.0 wt %, 18.0 wt %, 20.0 wt %, 22.0 wt %, or 24.0 wt %.

The melting temperature of the polyethylene material is for example, 116° C., 118° C., 120° C., 121° C., 122° C., 123° C., 125° C., or 128° C.

In a preferred embodiment of the present application, the amount of the fraction of the polyethylene material at 50° C. is in a range of 9.0 wt %-40.0 wt %, preferably in a range of 10.0 wt %-25.0 wt %, more preferably in a range of 10.2 wt %-16.0 wt %, for example 9.5 wt %, 9.9 wt %, 10.2 wt %, 11.0 wt %, 12.0 wt %, 13.0 wt %, 14.0 wt %, or 15.0 wt %.

A prominent feature of the polyethylene polymer provided by the present application is that compared with existing routine polyethylene for example the polyethylene prepared by the traditional gaseous polymerization, it has distinctly improved amount of low-molecular-weight fractions (especially the fraction at 40° C.) and the low-molecular-weight fractions are highly branched. It is known that the smaller the molecular weight of polyethylene is, the higher the branching degree is, and the lower the crystallinity degree is. Therefore, it can be appreciated by those skilled in the art that when the amount of low-molecular-weight fractions is high, the melting temperature of the polyethylene material will decrease. However, the inventors of the present application were surprised to find that the polyethylene material provided by the present application still has a relatively high melting temperature despite that the amount of its low-molecular-weight fractions was high. The inventors further found that the polyethylene material of the present application and having such a feature has excellent bidirectional malleability and is a material having good machinability and applicability especially suitable for use in preparation of films.

In a preferred embodiment of the present application, an amount of a fraction of the polyethylene material at 110° C. is in a range of 8.0 wt %-30.0 wt %, preferably in a range of 9.0 wt %-18.0 wt %, for example 9.0 wt %, 10.0 wt %, 11.0 wt %, 12.0 wt %, 13.0 wt %, 14.0 wt %, 15.0 wt %, or 16.0 wt %.

The amount of high-molecular-weight fractions (especially fractions at 110° C.) of the polyethylene material provided by the present application is also relatively high, and the branching degree thereof is also improved compared with commonly used polyethylene. Therefore, branches in the polyethylene polymer provided by the present application are widely distributed among molecular chains, and many branches are distributed in high-molecular-weight fractions.

In a preferred embodiment of the present application, as determined by temperature rising elution fractionation, a standard deviation of amounts of two fractions of the polyethylene material at temperatures at an interval of 10° C. from 40° C. to 110° C. is in a range of 0%-6.0%, preferably in a range of 0.5%-3.5%. According to this preferred embodiment of the present application, the amounts of different fractions of the polyethylene material are relatively average. This also reflects that the amount of the high-molecular-weight fractions and the amount of low-molecular-weight fractions of the polyethylene material of the present application are relatively high.

In a preferred embodiment of the present application, a number-average lamella thickness of the polyethylene material is in a range of 6 nm-18 nm, and a weight-average lamella thickness thereof is in a range of 8 nm-20 nm; a distribution coefficient of the lamella thickness (the weight-average lamella thickness/number-average lamella thickness) is preferably in a range of 1-1.333. The lamella thickness may be measured by the thermal fractionation by successive self-nucleation/annealing (SSA) technique which is commonly known in the art.

In a preferred embodiment of the present application, a weight-average molecular weight of the polyethylene material is in a range of 5000-350000, preferably in a range of 10000-250000, and a molecular weight distribution coefficient is in a range of 2.0-15.0, preferably in a range of 2.5-6.0.

According to a preferred embodiment of the present application, a melt flow index (230° C., 2.16 kg) of the polyethylene material is in a range of 0.8 g/10 min-2.0 g/10 min; a tensile yield strength thereof is in a range of 15 MPa-25 MPa; an elongation at break thereof is in a range of 450%-700%; and/or a falling dart impact strength thereof is in a range of 200 g-260 g. The haze of the polyethylene material provided by the present application is preferably in a range of 6%-18%.

The polyethylene material provided by the present application thus has good malleability and other good mechanical properties.

As can be seen from the foregoing, the present application provides a new polyethylene material having the above unique features (or combinations of features) and having good mechanical properties and machinability.

In a preferred embodiment of the present application, the polyethylene material is prepared in a single reactor.

In a more preferred embodiment of the present application, the polyethylene material is prepared in the single reactor by alternately conducting ethylene homopolymerization reaction and ethylene copolymerization reaction, or by alternately conducting different copolymerization reactions.

In other words, the polyethylene material provided by the present application is not prepared by physical mixing of ethylene homopolymers and/or ethylene copolymers having different molecular weights, or prepared by mixing and melting of the these components. Instead, the polyethylene material provided by the present application is prepared by chemical mixing of different fractions, i.e. mixing of different molecular chains.

In a preferred embodiment of the present application, the polyethylene material is prepared by a method (gas and liquid olefin polymerization process) comprising steps of: introducing a reaction material containing ethylene into the single reactor for polymerization reaction; and intermittently adding a condensate containing a comonomer so as to control and realize switching between ethylene homopolymerization and copolymerization, or switching between different copolymerization reactions in the single reactor.

To add the condensate containing the comonomer or not may be decided based on the predetermined type of the reaction to be carried out in the reactor, i.e., whether the reaction in the reactor is ethylene copolymerization or homopolymerization. For example, if it is determined that the reaction to be carried out next is a homopolymerization reaction, then the comonomer is not added any more. On the contrary, if it is determined that the reaction to be carried out next is a copolymerization reaction, then it is necessary to choose and introduce a suitable comonomer as required. Therefore, the expression "intermittently adding a condensate" means "to selectively add the condensate", for example, "to add the condensate every once in a while" or "not to add the condensate every once in a while", depending on requirement for the type of the reaction (copolymerization, or homopolymerization) to be carried out in the reactor.

In a preferred embodiment of the present application, condensates containing different types of comonomers may be stored separately in different storage tanks, and introduced into the reactor as required at a proper time.

In a preferred embodiment of the present application, preferably, ethylene copolymerization reaction is first carried out, and then ethylene homopolymerization reaction and ethylene copolymerization reaction are alternately carried out or different copolymerization reactions are alternately carried out. In other words, the initial reaction is ethylene copolymerization, and then the reaction is switched to ethylene homopolymerization, and after that the reaction is continued based on a predetermined reaction switching program. This preferred embodiment is advantageous in that copolymerization polyethylene particles produced in the initial reaction are loose, and active centers in the particles will not be buries, which ensures subsequent polymerization activity.

In a preferred embodiment of the present application, the polymerization reaction in the reactor is carried out at a pressure of 0.5 MPa-10 MPa, preferably 1.5 MPa-5 MPa, and at a temperature of 40° C.-150° C., preferably 50° C.-120° C.

In a specific example, when ethylene homopolymerization is carried out, the gas material is discharged out of the reactor through its top outlet, and is then compressed, condensed, and subjected to gas-liquid separation to generate a gas material flow and a liquid material flow. The liquid material flow mainly contains a comonomer and a condensate, and can be stored in a storage tank. The gas material flow mainly contains ethylene and hydrogen, and it is circulated, together with other materials, into the reactor through the bottom of the fluidized bed reactor. At this time, the inside of fluidized bed reactor is primarily an atmosphere of ethylene and hydrogen and contains little comonomer and condensate. In this case, growth polymerization of oethylene and homopolymerization occurs, and low-branching and high-density HDPE is thus produced. After the polymerization reaction proceeded for the predetermined time, the reaction is switched to ethylene copolymerization. The comonomer and the condensate are introduced into the reactor from the storage tank. The comonomer and the condensate may be introduced into the reactor from the bottom of the reactor or from a side wall of the upper part of the distribution plate through one inlet or through multiple inlets. Low-density and high-molecular-weight polyethylene is generated at a low-temperature reaction zone located at the lower portion; high-density and low-molecular-weight polyethylene is generated at a high-temperature reaction zone at the upper portion. Unreacted materials are discharged out of the reactor from its top and is compressed, condensed, and subjected to gas-liquid separation. The gas material flow and the liquid material flow resulted from the gas-liquid separation are all circulated back to the fluidized bed for continued reaction. When the reaction is finished after a predetermined polymerization time, the reaction is switched to olefin homopolymerization. Such operations are carried out sequentially and alternately. The total time for the polymerization is preferably 2 hs to 4 hrs. A polyethylene of excellent properties as desired is finally produced.

When ethylene copolymerization is used to prepare low/high-density polyethylene, the reaction system is supplied with ethylene, a comonomer, hydrogen, a catalyst, a promoter, and a condensing agent. The reactor is provided therein with a gas-liquid-solid reaction zone and a gas-solid reaction zone. The gas-solid reaction zone is a high-temperature reaction zone which contains a small amount of the comonomer, and the temperature thereof is preferably in a range of 80° C.-110° C., more preferably in a range of 80° C.-104° C. The polyethylene generated in this reaction zone has a relatively high density and a relatively low molecular weight. The gas-liquid-solid reaction zone is a low-temperature reaction zone which contains a large amount of the comonomer, and the temperature thereof is preferably in a range of 50° C.-77° C., more preferably in a range of 60° C.-77° C. The polyethylene generated in this reaction zone has a relatively low density and a relatively high molecular weight.

Further preferably, a temperature difference of at least 10° C., preferably of at least 15° C., exists between the gas-solid reaction zone and the gas-liquid-solid reaction zone.

In a preferred embodiment, at ethylene homopolymerization stage, the polymerization temperature is in a range of 80° C.-110° C., preferably in a range of 85° C.-110° C.

In a preferred embodiment of the present application, the switching between ethylene homopolymerization and the copolymerization is performed once per hour, preferably three times or more than three times per hour.

In a preferred embodiment of the present application, the switching between the different copolymerization reactions is performed at least once per hour, preferably three times or more than three times per hour.

According to a preferred embodiment of the present application, each homopolymerization is carried out continuously for 3 min-60 min, preferably 8 min-20 min; and each copolymerization reaction is carried out continuously for 5 min-60 min, preferably 8 min-20 min.

In a preferred embodiment of the present application, in ethylene copolymerization, the mole ratio of the comonomer to ethylene in the reactor is in a range of 0-0.1.

In a preferred embodiment of the present application, in olefin homopolymerization and olefin copolymerization, the mole ratio of the hydrogen to ethylene in the reactor is in a range of 0.01-1.0.

In a preferred embodiment of the present application, a flow rate of the reaction material gas is 1 ton/hr-500 ton/hr.

According to a preferred embodiment of the present application, the comonomer is selected from olefins containing less than 18 carbon atoms, preferably selected from the group consisting of butene, hexene, and octene, especially preferably selected from the group consisting of α-butene, α-hexene, and α-octene, most preferably is 1-hexene. The polyethylene material provided by the present application is preferably at least one random copolymer of ethylene and butene, and hexene and octene.

According to a preferred embodiment of the present application, the polyethylene material is a copolymer of ethylene/1-hexene, a random copolymer of ethylene/1-butene/1-hexene, or a random copolymer of ethylene/1-hexene/1-octene.

In a specific example of the present application, the polyethylene material is a copolymer of ethylene/1-butene/1-hexene, which is prepared by first carrying out a copolymerization reaction of ethylene, 1-butene, and 1-hexene, then switching to ethylene homopolymerization, again switching to copolymerization reaction of ethylene, 1-butene, and 1-hexene, and repeating these reactions alternately. The time for the copolymerization and homopolymerization reactions is defined as above.

In a specific example of the present application, the polyethylene material is a copolymer of ethylene/1-hexene/1-octene, which is prepared by first carrying out a copolymerization reaction of ethylene and 1-octene, then switching to ethylene homopolymerization, then switching to copolymerization reaction of ethylene and 1-hexene, then switching to ethylene homopolymerization, and again switching to copolymerization reaction of ethylene and 1-octene, and repeating these reactions alternately. The time for the copolymerization and homopolymerization reactions is defined as above.

A suitable condensate comprises at least one selected from the group consisting of C4-C7 saturated linear or branched alkanes, and C4-C7 cycloalkanes, preferably at least one selected from the group consisting of n-pentane, isopentane, hexane, and heptanes, most preferably is isopentane and/or hexane.

According to a preferred embodiment of the present application, in process of the polymerization reaction, at least one selected from the group consisting of a promoter, an antistatic agent, a chain transfer agent, a molecular regulator, a condensing agent, and an inert gas, is introduced into the reactor. The condensing agent in this preferred embodiment is an additional condensing agent, namely a condensing agent that may not contain comonomer.

The antistatic agent is a commonly used antistatic agent, which is, for example, one selected from the group consisting of aluminium distearate, ethoxylated amine, polysulfone copolymer, polymerized polyamine, oil soluble sulfoacid, and compositions comprising several of the foregoing.

The chain transfer agent is a commonly used chain transfer agent, which comprises hydrogen and a metal alkyl, preferably is hydrogen.

The inert gas may be a commonly used inert gas such as nitrogen.

The catalyst used in the preparation of the polyethylene material of the present application may be at least one of the following: Ziegler-Natta catalyst, a metallocene catalyst, a transition metal catalyst, inorganic chromium catalyst, organic chromium catalyst, or a composite catalyst comprising two catalysts. The catalyst is preferably a titanocene catalyst capable of enabling polymerization of polyethylene, more preferably a titanocene catalyst capable of loading on a carrier. The promoter is at least one selected from the group consisting of modified aluminoxane, aluminium diethyl monochloride, aluminium diisobutyl monochloride, ethylaluminum sesquichloride, aluminium diisobutyl, aluminium ethyl dichloride, trimethylaluminum, aluminumtriethyl, triisobutyl aluminium, trioctylaluminum, aluminium diethyl monohydrogen, and aluminium diisobutyl monohydrogen, and is preferably aluminumtriethyl or triisobutyl aluminium.

According to the present application, the reactor used for preparing the polyethylene material of the present application is preferably a fluidized bed reactor.

The present application further provides use of the polyethylene material of the present application, for example in preparation of films. The films (film products) preferably comprise package materials and/or product tags, more preferably comprising retortable films, high-transparency films, barrier and protective films, heat-seal films, tag films, or medical package films.

The polyethylene material provided by the present application has unique features. For example, the amount of low-molecular-weight and high-branching fractions is high, and the amount of high-molecular-weight fractions in also relatively high. Besides, the high-molecular-weight fractions are highly branched. Further, the polyethylene material is a polyethylene product covering all densities of polyethylene, and has suitable molecular weight and molecular weight distribution. The polyethylene material provided by the present application therefore has improved mechanical properties and processability such as good machinability and impact resistance, and is a material having promising application prospect.

BRIEF DESCRIPTION OF THE DRAWINGS

The present application will be described below in detail with reference to the accompanying drawings. It shall be appreciated that the drawings are provided merely for a better understanding of the present application, and shall not be construed as limiting the present application.

FIG. 1 shows results of comparison between branching analysis of polyethylene prepared in example 1 and branching analysis of polyethylene prepared in comparative example 3.

DETAILED DESCRIPTION OF THE EMBODIMENTS

The present application will be explained below in detail with reference to the examples and the accompanying drawings. It shall be appreciated that the examples and the drawings are merely exemplary descriptions of the present application, and shall not be construed as limiting protection scope of the present application. All reasonable variations and combinations within the spirit of the present application shall fall within the protection scope of the present application.

The characteristic parameters mentioned in the present application were determined by way of the methods described below.

Melting Temperature: A differential scanning calorimeter (Model: TA Q200; from TA Instruments, USA) was used to measure a melting temperature. The method for the measurement was specifically as follows. A sample of about 6 mg was first weighed. The sample was heated to a temperature of 220° C. at a rate of 20° C./min and then kept in a nitrogen gas flow for 2 min. Then the sample was cooled to a temperature of about 40° C. at a rate of 20° C./min and kept at 40° C. for 2 min for its crystallization. After that, the sample was heated to a temperature of 220° C. at a rate of 20° C./min for melting again. The process of melting and scanning were recorded to obtain a thermogram. A melting temperature was read from the thermogram.

Melt Flow Rate (MFR): MFR was determined according to GB/T3682-83 at a temperature of 230° C. under a load of 2.16 kg.

Density: Density was determined according to GB/T1033-70.

Tensile Yield Strength and Elongation at Break: Tensile yield strength and elongation at break were measured according to GB/T1040-79.

Haze: Haze was determined according to GB/T2410-80.

Falling Dart Impact Strength: Falling dart impact strength was determined according to GB/T9639-88.

Weight-average Molecular Weight and Molecular Weight Distribution Coefficient: Weight-average molecular weight and molecular weight distribution coefficient were determined by using Gel Permeation Chromatography with Polymer Laboratories PL-220. Column and rotary chamber were operated at a temperature of 140° C. 1,2,4-trichlorobenzene was used as a solvent. The concentration of the polymer is 3‰. The volume of the injection was 100 μL. The flow rate was 1.0 mL/min.

Temperature Rising Elution Fractionation (TREF) Experiment

TREF technique, taking advantage of the principle that different chain structure parameters have different influences on the crystallization and crystallinity of polyethylene, separates polyethylene molecules on the basis of crystallinity into multiple narrowly distributed fractions.

The process of TREF includes two stages: crystal precipitation and temperature rising elution.

At the crystal precipitation stage, polyethylene is dissolved at a high temperature to form a stable and dilute solution, and then the temperature is slowly lowered so that polyethylene crystal precipitated on a surface of a carrier substance (for example inert particulates such as quartz sand). Polyethylene molecules with different chain structures then form a crystal layer with gradient degrees of crystallinity. For example, polyethylene molecules with different contents of short-chain branches, due to their different crystallizability, would form a gradient distribution from inside to outside based on degrees of crystallinity.

At the temperature rising elution stage, the carrier substance with polyethylene crystal layer precipitated thereon is loaded in an elution column. Then, under the condition of continuous or intermit temperature rising, a good solvent of polyethylene is used to elute the carrier substance. Polyethylene products with different degrees of crystallinity are thus separated.

The TREF experiment used in the present application was a common operation in the art, and it was carried out specifically as follows.

(1) Treatment of Quartz Sand

Quartz sand was filled into an elution bottle, and washed with water to remove impurities. 50 mesh quartz sand was selected. The washed quartz sand was then roasted for 4 hours at a temperature of 800° C. After that, the elution bottle was filled with the treated quartz sand to a given height.

(2) Preparation of Polymer Solution 1.2 g of polymer sample (with the addition of 0.1 g of antioxidant BHT) was dissolved into 250 ml of xylene contained in a magnetic stirring vessel. After solids were dissolved in the solution and were no longer visible to naked eyes, the solution was stirred continuously for 2 hours to ensure adequate dissolution of the polymer sample. After that, the dissolved sample was carefully and rapidly poured into the quartz sand-containing bottle through a narrow neck of a three-neck flask, and was then washed with 60 ml of xylene solution which was poured into the quartz sand-containing elution bottle at two different times. It should be ensured that a surface of the entire solution after washing is lower than a surface of the quartz sand, preferably lower than the surface of the quartz sand by 1 cm to 2 cm.

(3) Programmed Cooling (Crystal Precipitation Stage)

After the sample solution was introduced into the elution bottle, programmed cooling of an oil bath was initiated. The temperature was lowered from 130° C. to room temperature (30° C.) at a rate of 1.5° C./h. During this process, polymers with a high-crystallization-temperature were first precipitated and covered the surface of the quartz sand, and then polymers with a low-crystallization-temperature were precipitated.

(4) Programmed Temperature Rising (Temperature Rising Elution Stage)

A flask containing pure xylene solvent was placed in an oil bath controlled by programmed temperature rising. Xylene was then introduced into the elution bottle through the high-end with a circulating pump, and the polymer solutions at different elution temperatures were pumped into collection flasks by means of a liquid level difference. The present application collected and measured fraction eluents in an elution temperature range of 40° C. to 110° C., and theeluent sample of a corresponding fraction was collected every 10° C.

(5) Treatment of Elution Solution

The obtained eluents of various fractions were vacuum concentrated by a rotary evaporator, respectively. Then, they were respectively precipitated by using isopropanol, then filtered, roasted, weighed, and finally calculated a content thereof.

Thermal Fractionation by Successive Self-Nucleation/Annealing (SSA) Experiment

SSA thermal fractionation technique usually includes the following steps.

(1) A sample is heated to a temperature higher than its melting temperature (at least 25° C. higher than the melting temperature), and then kept at the temperature for a time so as to eliminate heat history.

(2) The sample is cooled at a certain temperature-decreasing rate to a predetermined lowest temperature (this lowest temperature ensures that the sample can be crystallized at this temperature), and then kept at the lowest temperature for a time.

(3) The sample is heated at a certain temperature-increasing rate to a first predetermined self-nucleation temperature $T_s$ (which is usually 25° C. higher than the melting temperature), and then kept at the temperature for a time.

(4) Step (2) is repeated.

(5) The sample is heated at a certain temperature-increasing rate to a second predetermined self-nucleation temperature $T_s$ (which is lower than the first predetermined self-nucleation temperature $T_s$ by 2.5° C. or 5° C.), and then kept at the temperature for a time; heating is run repeatedly (the temperature range of the whole thermal fractionation treatment is similar to the melting range of the sample).

(6) The sample is heated at a certain temperature-increasing rate to the melting temperature set in step (1), and a temperature rising melting curve is recorded.

The thermal fractionation by SSA technique adopted in the present application is a common operation in the art, and it is specifically as follows.

A differential scanning calorimeter (Model: TA Q200; from TA Instruments, USA) was used. In a nitrogen atmosphere, a polyethylene sample was heated at a rate of 10° C./min from room temperature to 160° C. and kept at 160° C. for 3 min to eliminate heat history; the polyethylene sample was then cooled at a rate of 10° C./min to 0° C. and kept at 0° C. for 5 min; the sample was again heated at a rate of 10° C./min to a nucleation temperature $T_s$ and kept at the nucleation temperature $T_s$ for 5 min; the sample was again cooled at a rate of 10° C./min to 0° C. and kept for 5 min. A self-nucleation process was thus completed. The fractionation results of the self-nucleation and annealing of polyethylene at temperatures of 127° C., 122° C., 117° C., 112° C., 107° C., 102° C., and 97° C. were recorded, and fractions at each of the forgoing temperatures were expressed in sequence as P1, P2, P3, P4, P5, P6, P7. After the fractionation, the sample was heated at a rate of 10° C./min to 160° C., and a final melting curve was recorded.

EXAMPLE 1

Ethylene homopolymerization and ethylene/1-hexene copolymerization were carried out in a fluidized bed reactor to prepare the polyethylene material of the present application. The fluidized bed reactor was filled with a catalyst system of Ziegler-Natta catalyst and triethylaluminum. A reaction material gas (containing nitrogen, hydrogen, ethylene, methane, ethane, 1-hexene, and a small amount of isopentane) and a condensate isopentane (containing 1-hexene) were introduced into the reactor through its bottom inlet where the temperature was 58° C., and ethylene/1-hexene copolymerization reaction was first carried out. The rest gas after the reaction was used as a circulating gas and was discharged out of the reactor through its top outlet. The circulating gas was then compressed, condensed, and subjected to gas-liquid separation. The liquid material flow resulted from the gas-liquid separation was stored in a 1-hexene storage tank, and meanwhile the gas resulted from the gas-liquid separation was used as circulating gas and was circulated into the reactor through a reactor feed inlet for continued reaction. When the circulating gas was introduced into the bottom portion of the reactor bed, it was a mixture of gas and liquid. The liquid in the fluidized bed had a mass fraction of 24 wt %, and a superficial fluidizing gas velocity was 0.63 m/s. A polymerization temperature at the bottom portion of the bed (gas-liquid-solid reaction zone) was 68° C., while a polymerization temperature at the top portion of the bed (gas-solid reaction zone) was 85° C. In the circulating gas, the dew point temperature of liquid isopentane was between the temperature of the bottom portion and the temperature of the top portion of the bed. The copolymerization proceeded for 15 min.

After the copolymerization polymerization reaction proceeded for the predetermined time, the reaction was switched to ethylene homopolymerization phase. The circulating gas introduced into the bottom inlet of the reactor contained hydrogen, nitrogen, methane, ethane, ethylene, 1-hexene, and a small amount of isopentane, and had a pressure of 3.1 MPa and a temperature of 100° C. After the circulating gas was circulated for multiple times, the circulating gas discharged from a heat exchange did not contain the condensate, and had a gas density of 28.0 kg/m$^3$. After gas-liquid separation, α-olefin and isopentane (accounting for 80% of the circulating gas flow) were introduced into a material storage tank, and a small amount of the condensate and α-olefin that did not go through gas-liquid separation was introduced, together with the circulating gas, into the fluidized bed reactor. The gaseous polymerization ran for 8 min (including the operation time for process switching).

Then, the reaction was switched from ethylene homopolymerization to ethylene/1-hexene copolymerization. A condensate comprising 1-hexene and isopentane was introduced through a feed pump into the reactor from the upper portion of the distribution plate of the reactor bed. The polymerization temperature at the lower portion gradually decreased to 68° C. The copolymerization reaction at this stage proceeded for 15 min.

The above operations were carried out sequentially and alternately and the total time of polymerization was carried out for 3 hours. Polyethylene (a) was thus obtained.

Polyethylene (a) was subjected to temperature rising elution fractionation testing, successive self-nucleation/annealing (SSA) thermal fractionation testing, and other property testing, respectively. The amounts of fractions at different temperatures were shown in Table 1. Results of thermal fractionation by successive self-nucleation/annealing (SSA) testing were shown in Table 2, and results of other property testing were shown in Table 3.

In addition, a nuclear magnetic resonance spectrometer (from Varian, USA; Model: NMK/300 MHZ) was used to analyze the degree of branching of polyethylene (a). The analysis results were compared with the testing results of traditional vapor deposition for preparing polyethylene. Results were shown in Table 1.

By referring to Table 2 and by introducing parameters of statistics, polydispersity of lamella thickness was expressed quantitatively. Equation (1) and equation (2) were used to respectively calculate the number-average lamella thickness (ln) and weight-average lamella thickness (lw). Equation (3) was used to calculate the distribution coefficient (I) of the lamella thickness. Results were shown in Table 4. The larger I was, the wider the distribution of the lamella thickness was, i.e., the wider the crystallizable sequence length distribution was and in a molecular structure more irregular short-chain branching distribution was.

$$l_n = (n_1 l_1 + n_2 l_2 + \ldots + n_i l_i)/(n_1 + n_2 + \ldots + n_i) = \Sigma f_i l_i \quad (1)$$

$$l_w = (n_1 l_1^2 + n_2 l_2^2 + \ldots + n_i l_i^2)/(n_1 l_1 + n_2 l_2 + \ldots + n_i l_i)$$
$$= \Sigma f_i l_i^2 / \Sigma f_i l_i \quad (2)$$

$$I = l_w / l_n \quad (3)$$

In the equations, $n_i$ represents the peak area of each fraction; $l_i$ represents the number-average lamella thickness of each fraction; and $f_i$ represents the relative amount of each fraction.

EXAMPLE 2

Ethylene homopolymerization and ethylene/1-hexene copolymerization were carried out in a fluidized bed reactor to prepare the polyethylene material of the present application. The fluidized bed reactor was filled with a catalyst system of Ziegler-Natta catalyst and triethylaluminum. A reaction material gas (containing hydrogen, nitrogen, methane, ethane, ethylene, 1-hexene, and a small amount of isopentane) and a condensate isopentane (containing 1-hexene) were introduced into the reactor through its bottom inlet where the temperature was 60° C., and ethylene/1-hexene copolymerization reaction was first carried out. The rest gas after the reaction was used as a circulating gas and was discharged out of the reactor through its top outlet. The circulating gas was then compressed, condensed, and subjected to gas-liquid separation. The liquid material flow resulted from gas-liquid separation was stored in a 1-hexene storage tank, and meanwhile the gas resulted from gas-liquid separation was used as a circulating gas and was circulated into the reactor through a reactor feed inlet for continued reaction. When the circulating gas was introduced into the bottom portion of the reactor bed, it was a mixture of gas and liquid. The liquid in the fluidized bed had a mass fraction of 26 wt %, and a superficial fluidizing gas velocity was 0.68 m/s. A polymerization temperature at the bottom portion of the bed (gas-liquid-solid reaction zone) was 75° C., while a polymerization temperature at the top portion of the bed (gas-solid reaction zone) was 92° C. In the circulating gas, the dew point temperature of liquid isopentane was between the temperature of the bottom portion and the temperature of the top portion of the bed. The copolymerization proceeded for 20 min.

After the copolymerization polymerization reaction proceeded for the predetermined time, the reaction was switched to ethylene homopolymerization phase. The circulating gas introduced into the bottom inlet of the reactor contained hydrogen, nitrogen, methane, ethane, ethylene, 1-hexene, and a small amount of isopentane, and had a pressure of 3.6 MPa and a temperature of 96° C. After the circulating gas was circulated for multiple times, the circulating gas discharged from a heat exchange did not contain the condensate, and had a gas density of 27.2 kg/m$^3$. After gas-liquid separation, α-olefin and isopentane (accounting for 80% of the circulating gas flow) were introduced into a material storage tank, and a small amount of the condensate and α-olefin that did not go through gas-liquid separation was introduced, together with the circulating gas, into the fluidized bed reactor. The gaseous polymerization ran for 12 min (including the operation time for process switching).

Then, the reaction was switched from ethylene homopolymerization to ethylene/1-hexene copolymerization. A condensate comprising 1-hexene and isopentane was introduced through a feed pump into the reactor from the upper portion of the distribution plate of the reactor bed. The polymerization temperature at the lower portion gradually decreased to 75° C. The copolymerization reaction at this stage proceeded for 8 min.

The above operations were carried out sequentially and alternately and the polymerization was carried out for 3 hours in total. Polyethylene (b) was thus obtained.

Polyethylene (b) was subjected to temperature rising elution fractionation testing, thermal fractionation by successive self-nucleation/annealing (SSA) testing, and other property testing, respectively. The amounts of fractions at different temperatures were shown in Table 1. Results of thermal fractionation by successive self-nucleation/annealing (SSA) testing were shown in Table 2, and results of other property testing were shown in Table 3.

EXAMPLE 3

Ethylene homopolymerization and ethylene/1-hexene copolymerization were carried out in a fluidized bed reactor to prepare the polyethylene material of the present application. The fluidized bed reactor was filled with a catalyst system of Ziegler-Natta catalyst and triethylaluminum. A reaction material gas (containing hydrogen, nitrogen, methane, ethane, ethylene, 1-hexene, and a small amount of isopentane) and a condensate isopentane (containing 1-hexene) were introduced into the reactor through its bottom inlet where the temperature was 56° C., and ethylene/1-hexene copolymerization reaction was first carried out. The rest gas after the reaction was used as a circulating gas and was discharged out of the reactor through its top outlet. The circulating gas was then compressed, condensed, and subjected to gas-liquid separation. The liquid material flow resulted from gas-liquid separation was stored in a 1-hexene storage tank, and meanwhile the gas resulted from gas-liquid separation was used as circulating gas and was circulated into the reactor through a reactor feed inlet for continued reaction. When the circulating gas was introduced into the bottom portion of the reactor bed, it was a mixture of gas and liquid. The liquid in the fluidized bed had a mass fraction of 30 wt %, and a superficial fluidizing gas velocity was 0.62 m/s. A polymerization temperature at the bottom portion of the bed (gas-liquid-solid reaction zone) was 70° C., while a polymerization temperature at the top portion of the bed (gas-solid reaction zone) was 84° C. In the circulating gas, the dew point temperature of liquid isopentane was between the temperature of the bottom portion and the temperature of the top portion of the bed. The copolymerization proceeded for 8 min.

After the copolymerization polymerization reaction proceeded for the predetermined time, the reaction was switched to ethylene homopolymerization phase. The circulating gas introduced into the bottom inlet of the reactor contained hydrogen, nitrogen, methane, ethane, ethylene, 1-hexene, and a small amount of isopentane, and had a pressure of 2.6 MPa and a temperature of 88° C. After the circulating gas was circulated for multiple times, the circulating gas discharged from a heat exchange did not contain the condensate, and had a gas density of 28.2 kg/m$^3$. After gas-liquid separation, 1-hexene and isopentane (accounting for 80% of the circulating gas flow) were introduced into a material storage tank, and a small amount of the condensate and 1-hexene that did not go through gas-liquid separation was introduced, together with the circulating gas, into the fluidized bed reactor. The gaseous polymerization ran for 8 min (including the operation time for process switching).

Then, the reaction was switched from ethylene homopolymerization to ethylene/1-hexene copolymerization. A condensate comprising 1-hexene and isopentane was introduced through a feed pump into the reactor from the upper portion of the distribution plate of the reactor bed. The polymerization temperature at the lower portion gradually decreased to 70° C. The copolymerization reaction at this stage proceeded for 12 min.

The above operations were carried out sequentially and alternately and the polymerization was carried out for 2.5 hours in total. Polyethylene (c) was thus obtained.

Polyethylene (c) was subjected to temperature rising elution fractionation testing, thermal fractionation by successive self-nucleation/annealing (SSA) testing, and other property testing, respectively. The amounts of fractions at different temperatures were shown in Table 1. Results of successive self-nucleation/annealing (SSA) thermal fractionation testing were shown in Table 2, and results of other property testing were shown in Table 3.

EXAMPLE 4

Ethylene homopolymerization and ethylene/1-butene/1-hexene copolymerization were carried out in a fluidized bed reactor to prepare the polyethylene material of the present application. The fluidized bed reactor was filled with a catalyst system of Ziegler-Natta catalyst and triethylaluminum. A reaction material gas (containing hydrogen, nitrogen, methane, ethane, ethylene, 1-butene, 1-hexene, and a small amount of isopentane) and a condensate isopentane (containing 1-hexene) were introduced into the reactor through its bottom inlet where the temperature was 56° C., and ethylene/1-butene/1-hexene copolymerization reaction was first carried out. The rest gas after the reaction was used as a circulating gas and was discharged out of the reactor through its top outlet. The circulating gas was then compressed, condensed, and subjected to gas-liquid separation. The liquid material flow resulted from the gas-liquid separation was stored in a 1-hexene storage tank, and meanwhile the gas resulted from the gas-liquid separation was used as circulating gas and was circulated into the reactor through a reactor feed inlet for continued reaction. When the circulating gas was introduced into the bottom portion of the reactor bed, it was a mixture of gas and liquid. The liquid in the fluidized bed had a mass fraction of 26 wt %, and a superficial fluidizing gas velocity was 0.58 m/s. A polymerization temperature at the bottom portion of the bed (gas-liquid-solid reaction zone) was 70° C., while a polymerization temperature at the top portion of the bed (gas-solid reaction zone) was 86° C. In the circulating gas, the dew point temperature of liquid isopentane was between the temperature of the bottom portion and the temperature of the top portion of the bed. The copolymerization proceeded for 8 min.

After the copolymerization polymerization reaction proceeded for the predetermined time, the reaction was switched to ethylene homopolymerization phase. The circulating gas introduced into the bottom inlet of the reactor contained hydrogen, nitrogen, methane, ethane, ethylene, 1-butene, and a small amount of isopentane, and had a pressure of 2.6 MPa and a temperature of 78° C. After the circulating gas was circulated for multiple times, the circulating gas discharged from a heat exchange did not contain the condensate, and had a gas density of 26.2 kg/m$^3$. After gas-liquid separation, α-olefin and isopentane (accounting for 80% of the circulating gas flow) were introduced into a material storage tank, and a small amount of the condensate and 1-butene that did not go through gas-liquid separation was introduced, together with the circulating gas, into the fluidized bed reactor. The gaseous polymerization ran for 16 min (including the operation time for process switching).

Then, the reaction was switched from ethylene homopolymerization to ethylene/1-butene/1-hexene copolymerization. A condensate comprising 1-hexene and isopentane was introduced through a feed pump into the reactor from the upper portion of the distribution plate of the reactor bed. The polymerization temperature at the lower portion gradually decreased to 70° C. The copolymerization reaction at this stage proceeded for 12 min.

The above operations were carried out sequentially and alternately and the polymerization was carried out for 3.5 hours in total. Polyethylene (d) was thus obtained.

Polyethylene (d) was subjected to temperature rising elution fractionation testing, thermal fractionation by successive self-nucleation/annealing (SSA) testing, and other property testing, respectively. The amounts of fractions at different temperatures were shown in Table 1. Results of thermal fractionation by successive self-nucleation/annealing (SSA) testing were shown in Table 2, and results of other property testing were shown in Table 3.

EXAMPLE 5

Ethylene homopolymerization and ethylene/1-hexene/1-octene copolymerization were carried out in a fluidized bed reactor to prepare the polyethylene material of the present application. The fluidized bed reactor was filled with a catalyst system of Ziegler-Natta catalyst and triethylaluminum.

A reaction material gas (containing hydrogen, nitrogen, methane, ethane, ethylene, 1-octene, and a small amount of isopentane) and a condensate isopentane (containing 1-octene) were introduced into the reactor through its bottom inlet where the temperature was 62° C., and ethylene/1-octene copolymerization reaction was first carried out. The rest gas after the reaction was used as a circulating gas and was guided out of the reactor through its top outlet. The circulating gas was then compressed, condensed, and subjected to gas-liquid separation. The liquid material flow resulted from gas-liquid separation was stored in a 1-octene storage tank, and meanwhile the gas resulted from gas-liquid separation was used as circulating gas and was circulated into the reactor through a reactor feed inlet for continued reaction. When the circulating gas was introduced into the bottom portion of the reactor bed, it was a mixture of gas and liquid. The liquid in the fluidized bed had a mass fraction of 26 wt %, and a superficial fluidizing gas velocity was 0.66 m/s. A polymerization temperature at the bottom portion of the bed (gas-liquid-solid reaction zone) was 66° C., while a polymerization temperature at the top portion of the bed (gas-solid reaction zone) was 90° C. In the circulating gas, the dew point temperature of liquid isopentane was between the temperature of the bottom portion and the temperature of the top portion of the bed. The copolymerization proceeded for 10 min.

After the ethylene/1-octene copolymerization polymerization reaction proceeded for the predetermined time, the reaction was switched to ethylene homopolymerization phase. The circulating gas introduced into the bottom inlet of the reactor contained hydrogen, nitrogen, methane, ethane, ethylene, 1-octene, and a small amount of isopentane, and had a pressure of 2.6 MPa and a temperature of 96° C. After the circulating gas was circulated for multiple times, the circulating gas discharged from a heat exchange did not contain the condensate, and had a gas density of 26.2 kg/m³. After gas-liquid separation, α-olefin and isopentane (accounting for 80% of the circulating gas flow) were introduced into a material storage tank, and a small amount of the condensate and 1-octene that did not go through gas-liquid separation was introduced, together with the circulating gas, into the fluidized bed reactor. The gaseous polymerization ran for 10 min (including the operation time for process switching).

Then, the reaction was switched to ethylene/1-hexene copolymerization. The above circulating gas was circulated into the reactor through a bottom feed inlet for continued reaction, and meanwhile 1-hexene and a condensate were also introduced. The rest gas after the reaction was used as a circulating gas and was discharged out of the reactor through its top outlet. The circulating gas was then compressed, condensed, and subjected to gas-liquid separation. The liquid material flow resulted from gas-liquid separation was stored in a 1-hexene storage tank, and meanwhile the gas resulted from gas-liquid separation was used as circulating gas and was circulated into the reactor through a reactor feed inlet for continued reaction. When the circulating gas was introduced into the bottom portion of the reactor bed, it was a mixture of gas and liquid. The liquid in the fluidized bed had a mass fraction of 29 wt %, and a superficial fluidizing gas velocity was 0.72 m/s. A polymerization temperature at the bottom portion of the bed (gas-liquid-solid reaction zone) was 70° C., while a polymerization temperature at the top portion of the bed (gas-solid reaction zone) was 88° C. In the circulating gas, the dew point temperature of liquid isopentane was between the temperature of the bottom portion and the temperature of the top portion of the bed. The copolymerization proceeded for 8 min.

After the ethylene/1-hexene copolymerization polymerization reaction proceeded for the predetermined time, the reaction was switched to ethylene homopolymerization phase. The circulating gas introduced into the bottom inlet of the reactor contained hydrogen, nitrogen, methane, ethane, ethylene, 1-hexene, and a small amount of isopentane, and had a pressure of 2.8 MPa and a temperature of 96° C. After the circulating gas was circulated for multiple times, the circulating gas discharged from a heat exchange did not contain the condensate, and had a gas density of 26.8 kg/m³. After gas-liquid separation, α-olefin and isopentane (accounting for 80% of the circulating gas flow) were introduced into a material storage tank, and a small amount of the condensate and 1-hexene that did not go through gas-liquid separation was introduced, together with the circulating gas, into the fluidized bed reactor. The gaseous polymerization ran for 8 min (including the operation time for process switching).

Then, the reaction was switched from ethylene homopolymerization to ethylene/1-octene copolymerization. A condensate comprising 1-octene and isopentane was introduced through a feed pump into the reactor from the upper portion of the distribution plate of the reactor bed. The polymerization temperature at the lower portion gradually decreased to 66° C. The copolymerization reaction at this stage proceeded for 10 min.

The above operations were carried out sequentially and alternately and the polymerization was carried out for 4.5 hours. Polyethylene (e) was thus obtained.

Polyethylene (e) was subjected to temperature rising elution fractionation testing, thermal fractionation by successive self-nucleation/annealing (SSA) testing, and other property testing, respectively. The amounts of fractions at different temperatures were shown in Table 1. Results of thermal fractionation by successive self-nucleation/annealing (SSA) testing were shown in Table 2, and results of other property testing were shown in Table 3.

COMPARATIVE EXAMPLE 1

In accordance with the method described in the examples of patent application CN200580027288, in a single reactor system, a double peak polyethylene resin product was prepared by gaseous polymerization and by using a spray-dried catalyst system. In this comparative example, a spray-dried catalyst composition was suspended in a mixture of mineral oil and hexane to obtain a catalyst slurry for injection into a fluidized bed reactor. Typical reaction conditions were: a polymerization temperature being 85° C.-100° C., a content of hexene comonomer being about 0.007 (C6:C2 molar ratio), and H2:C2 molar ratio being 0.0035. Double peak polyethylene (f) prepared by this method had a density of about 0.946, and a spread of up to 95.

Polyethylene (f) was subjected to temperature rising elution fractionation testing, thermal fractionation by successive self-nucleation/annealing (SSA) testing, and other property testing, respectively. The amounts of fractions at different temperatures were shown in Table 1. Results of thermal fractionation by successive self-nucleation/annealing (SSA) testing were shown in Table 2, and results of other property testing were shown in Table 3.

COMPARATIVE EXAMPLE 2

An industrial fluidized bed olefin polymerization reactor having a diameter of 3 m and a cylinder height of 12 m was used. 1-butene was used as a comonomer. Reactants comprised: 30.12 vol % ethylene, 6.98 vol % 1-butane, 6.30 vol % hydrogen. A promoter methylaluminoxane having a concentration of 300 ppm was added into the reactor, followed by starting a catalyst feed unit which then fed a metallocene catalyst into the fluidized bed reactor at a flow rate of 1.0 kg/hr. By using this gaseous polymerization method, metallocene polyethylene (g) was prepared.

Polyethylene (g) was subjected to temperature rising elution fractionation testing, thermal fractionation by successive self-nucleation/annealing (SSA) testing, and other property testing, respectively. The amounts of fractions at different temperatures were shown in Table 1. Results of thermal fractionation by successive self-nucleation/annealing (SSA testing were shown in Table 2, and results of other property testing were shown in Table 3.

COMPARATIVE EXAMPLE 3

Degree of branching of polyethylene Brand 1820 prepared by Shandong Qilu Petrochemical Engineering Co. Ltd was analyzed by using the same method as used in Example 1 for analyzing degree of branching. The polyethylene in this example was prepared by gaseous polymerization in a fluidized bed reactor using ethylene as a material, 1-butene as a comonomer, and hydrogen as a chain transfer agent.

TABLE 1

Results of fractionation of polyethylene by temperature rising elution

| Grade of Fraction (Fractionated by Temperature) | Example 1 Polyethylene (a) | Example 2 Polyethylene (b) | Example 3 Polyethylene (c) | Example 4 Polyethylene (d) | Example 5 Polyethylene (e) | Comparative Example 1 Polyethylene (f) | Comparative Example 2 Polyethylene (g) |
|---|---|---|---|---|---|---|---|
| 40° C. | 16.3 | 15.4 | 13.1 | 11.9 | 10.6 | 4.5 | 0.0 |
| 50° C. | 13.6 | 12.5 | 11.5 | 10.4 | 11.3 | 6.6 | 0.0 |
| 60° C. | 11.6 | 10.9 | 9.9 | 10.8 | 12.4 | 9.7 | 0.0 |
| 70° C. | 12.3 | 11.5 | 11.9 | 12.1 | 13.4 | 11.5 | 0.2 |
| 80° C. | 13.3 | 12.9 | 14.2 | 15.7 | 14.7 | 13.9 | 0.2 |
| 90° C. | 12.5 | 13.7 | 16.3 | 14.8 | 12.9 | 16.0 | 0.3 |
| 100° C. | 11.5 | 12.2 | 12.4 | 13.5 | 12.9 | 18.0 | 0.3 |
| 110° C. | 9.9 | 10.9 | 10.7 | 10.8 | 11.8 | 19.8 | 99.0 |
| Standard Deviation S | 1.94% | 1.61% | 2.33% | 2.07% | 2.18% | 5.76% | 35.2% |

TABLE 2

Results of thermal fractionation of polyethylene by successive self-nucleation/annealing

| | a | | | | b | | | |
|---|---|---|---|---|---|---|---|---|
| Fractions | $T_m$/° C. | $f_i$/% | l/nm | MSL | $T_m$/° C. | $f_i$/% | l/nm | MSL |
| P1 | 89.41 | 13.47 | 4.55 | 41.46 | 89.1 | 15.73 | 4.52 | 41.16 |
| P2 | 100.15 | 6.42 | 5.62 | 54.83 | 100.47 | 6.99 | 5.66 | 55.34 |
| P3 | 105.33 | 8.11 | 6.34 | 64.34 | 105.58 | 8.73 | 6.38 | 64.87 |
| P4 | 110.53 | 10.69 | 7.29 | 77.37 | 110.77 | 11.09 | 7.34 | 78.09 |

TABLE 2-continued

Results of thermal fractionation of polyethylene by successive self-nucleation/annealing

| | | | | | | | | |
|---|---|---|---|---|---|---|---|---|
| P5 | 116.02 | 13.62 | 8.64 | 97.56 | 116.18 | 13.94 | 8.69 | 98.29 |
| P6 | 121.35 | 15.50 | 10.54 | 129.24 | 121.6 | 17.21 | 10.65 | 131.21 |
| P7 | 127.45 | 32.19 | 14.10 | 201.69 | 127.86 | 26.30 | 14.43 | 209.43 |

| | c | | | | d | | | |
|---|---|---|---|---|---|---|---|---|
| Fractions | Tm/° C. | $f_i$/% | l/nm | MSL | Tm/° C. | $f_i$/% | l/nm | MSL |
| P1 | 89.21 | 16.76 | 4.59 | 41.45 | 89.34 | 16.71 | 4.43 | 41.34 |
| P2 | 100.45 | 6.34 | 5.65 | 54.89 | 100.54 | 6.33 | 5.45 | 54.23 |
| P3 | 105.54 | 8.34 | 6.32 | 65.43 | 105.94 | 8.54 | 6.76 | 66.54 |
| P4 | 110.67 | 10.77 | 7.54 | 78.45 | 110.45 | 10.45 | 7.45 | 78.76 |
| P5 | 116.97 | 13.08 | 8.67 | 99.65 | 116.76 | 13.06 | 8.87 | 99.34 |
| P6 | 121.34 | 15.21 | 11.73 | 134.65 | 121.46 | 1512 | 11.31 | 132.32 |
| P7 | 127.55 | 32.45 | 14.99 | 211.76 | 127.23 | 32.34 | 15.12 | 212.54 |

| | e | | | | f | | | |
|---|---|---|---|---|---|---|---|---|
| Fractions | Tm/° C. | $f_i$/% | l/nm | MSL | Tm/° C. | $f_i$/% | l/nm | MSL |
| P1 | 88.66 | 9.45 | 4.23 | 40.11 | 90.07 | 9.26 | 4.60 | 42.11 |
| P2 | 98.67 | 7.89 | 5.23 | 52.90 | 100.91 | 5.01 | 5.72 | 56.06 |
| P3 | 105.34 | 8.87 | 6.21 | 63.68 | 106 | 6.32 | 6.45 | 65.78 |
| P4 | 108.79 | 8.98 | 7.13 | 75.08 | 111.18 | 8.43 | 7.42 | 79.34 |
| P5 | 113.60 | 12.65 | 8.56 | 99.09 | 116.76 | 12.10 | 8.86 | 101.05 |
| P6 | 118.79 | 14.87 | 10.57 | 132.78 | 122.35 | 15.05 | 11.00 | 137.46 |
| P7 | 125.09 | 37.29 | 14.07 | 231.05 | 129.08 | 43.83 | 15.49 | 236.28 |

| | g | | | |
|---|---|---|---|---|
| Fractions | Tm/° C. | $f_i$/% | l/nm | MSL |
| P1 | — | — | — | — |
| P2 | — | — | — | — |
| P3 | — | — | — | — |
| P4 | — | — | — | — |
| P5 | — | — | — | — |
| P6 | — | — | — | — |
| P7 | 118.69 | 99.56 | 8.87 | 103.54 |

Notes:
Tm represents melting temperature;
fi represents the relative amount of each fraction;
l represents number-average lamella thickness; and
MSL represents methylene sequence length.

TABLE 3

Index of physical properties of polyethylene

| | Example 1 Polyethylene (a) | Example 2 Polyethylene (b) | Example 3 Polyethylene (c) | Example 4 Polyethylene (d) | Example 5 Polyethylene (e) | Comparative Example 1 Polyethylene (f) | Comparative Example 2 Polyethylene (g) | Determination Methods |
|---|---|---|---|---|---|---|---|---|
| Density (g/cm$^3$) | 0.902 | 0.921 | 0.929 | 0.942 | 0.894 | 0.944 | 0.917 | GB/T1033-70 |
| Melt Flow Rate (g/10 min) | 0.81 | 0.98 | 0.91 | 0.84 | 0.99 | 1.51 | 1.82 | GB/T3682-83 |
| Tensile Yield Strength (MPa) | 19 | 21 | 22 | 24 | 23 | 18 | 17 | GB/T1040-79 |
| Elongation at Break (%) | 700 | 710 | 650 | 650 | 720 | 520 | 350 | GB/T1040-79 |
| Melting Temperature (° C.) | 123 | 128 | 130 | 135 | 121 | 128 | 118 | GB/T4608-84 |
| Haze (%) | 11.6 | 10.5 | 12.4 | 11.9 | 10.9 | 12.5 | 11.0 | GB/T2410-80 |
| Falling Dart Impact Strength (g) | 206 | 214.6 | 209.5 | 218 | 223.6 | 234.5 | 215.0 | GB/T9639-88 |
| Weight-average Molecular Weight | 126821 | 134698 | 137925 | 146658 | 129836 | 174255 | 123506 | — |

TABLE 3-continued

Index of physical properties of polyethylene

| | Example 1 Polyethylene (a) | Example 2 Polyethylene (b) | Example 3 Polyethylene (c) | Example 4 Polyethylene (d) | Example 5 Polyethylene (e) | Comparative Example 1 Polyethylene (f) | Comparative Example 2 Polyethylene (g) | Determination Methods |
|---|---|---|---|---|---|---|---|---|
| Molecular Weight Distribution Coefficient (PDI) | 3.62 | 3.42 | 3.64 | 3.57 | 3.73 | 7.19 | 1.21 | — |

TABLE 4

| Samples | Number-average Lamella Thickness $l_n$/nm | Weight-average Lamella Thickness $l_w$/nm | Distribution Coefficient I |
|---|---|---|---|
| Example 1 (Polymer a) | 9.32 | 10.71 | 1.149 |

It can be seen from Table 1 that each of the polyethylene (a)-(e) prepared by the method of the present application has a fraction amount (of temperature rising elution fractionation) at 40° C. in a range of 9.0%-40.0%, and a standard deviation of two fractions at temperatures at an interval of 10° C. from 40° C. to 110° C. in a range of 0%-6.0%. The polyethylene (f) prepared in comparative example 1 has a fraction amount at 40° C. that is not in the range of 9.0%-40.0%. The polyethylene (g) prepared by the method of the comparative example 2 was prepared by using a metallocene catalyst; its molecular weight distribution coefficient is very small (PDI=1.1); its fraction amount at 40° C. is 0%, and a standard deviation of its fractions at temperatures from 40° C. to 110° C. is 35.1%, not in the range reasonably sought to be protected by the present application.

As can be found from the data of Table 2, lamella thickness distributions of polyethylene (a)-(e) prepared by the method of the present application are similar, and the lamella thickness of the fraction (high-molecular-weight fraction) of P7 is in a range of 14 nm-15 nm, which is smaller than the lamella thickness of polyethylene (f) and the lamella thickness of polyethylene (g). This indicates that the polyethylene prepared by the method of the present application has a wider branching distribution, and that the high-molecular-weight fraction has a dramatically improved branching amount. The mechanical property of the product is thus greatly improved.

As can be found further from Table 2, the amounts of the fraction P1 (low-molecular-weight fraction) of the polyethylene (a)-(e) prepared by the method of the present application are higher than those of polyethylene (f), and polyethylene (g), which is consistent with the data of temperature rising elution fractionation shown in Table 1. The increase of the amount of the low-molecular-weight fraction increases the machinability of products and enables the polyethylene product prepared by the present application to be better used in forming and machining.

When the data of Table 1 and the data of Table 3 are compared, it is found that the polyethylenes (a), (b), (c), (d), and (e) prepared by the method of the present application have obvious property advantage over the polyethylene (f) prepared by the method of comparative example 1 and the metallocene polyethylene g prepared in comparative example 2 in melt flow index, tensile yield strength, elongation at break, and falling dart impact strength.

When analyzed from the perspective of chain structure, the polyethylene prepared by the method of the present application is primarily characterized by the distinct improvement of amount of the low-molecular-weight fraction and the dramatic increase of the branching amount of the high-molecular-weight fraction. The mechanical strength of polyethylene depends mainly on the high-molecular-weight fraction. Branches in the high-molecular-weight fraction enhance the entwining among tie molecules, thereby improving the tensile strength of products.

It can be seen from FIG. 1 that branches of the polyethylene prepared by the traditional gaseous polymerization are distributed on molecular chains with a molecular weight of less than 110000, while the distribution of branches of the polyethylene prepared by the present application reaches molecular chains with a molecular weight of 150000, as a result of which, the branches are distributed widely between molecular chains, and the amount of branches in the high-molecular-weight fraction is greatly increased.

Analyzed from the perspective of crystalline structure, the low-molecular-weight fraction and the high-degree branching fraction of the polyethylene prepared by the method of the present application play an important role in the nucleation; crystal grains of sphere crystals of the entire polymer are therefore more in number and smaller in sizes. For polyethylene, properties thereof are significantly influenced by the size of the sphere crystals. In general, the smaller the size of the sphere crystal is, the lower the haze of the polyethylene is, i.e., the higher the transparency thereof is; the smaller the size of the sphere crystal is, the higher the impact strength of the polyethylene is.

Although the present application has been explained in detail as above, for one skilled in the art, it would be obvious to make any variations within the spirit and protection scope of the present application. It shall also be appreciated that those various aspects, different parts of different examples, and those features recited in the present application are all combinable with one another or wholly or entirely exchangeable between each other. In the specific examples described above, those examples referring to another specific example may be combined with another example in a suitable manner, which would be apprehensible by one skilled in the art. In addition, one skilled in the art shall further be appreciated that the foregoing descriptions are merely exemplary examples of the present application, and are not intended for limiting the present application.

The invention claimed is:

1. A polyethylene material, having:
a density distribution in a range of 0.880 g/cm$^3$ to 0.960 g/cm$^3$;
an amount of eluted fraction at 40° C. in a range of 9.0 wt % to 40.0 wt %, an amount of eluted fraction at 50° C. in a range of 9.0 wt % to 40.0 wt %, and an amount of eluted fraction at 60° C. in a range of 9.9 wt % to 12.4 wt %, as determined by temperature rising elution fractionation on the polyethylene material; and a melting temperature of the polyethylene material is in a range of 110° C. to 135° C.

2. The polyethylene material according to claim 1, having an amount of eluted fraction at a temperature of 110° C. in a range of 8.0 wt % to 30.0 wt %.

3. The polyethylene material according to claim 1, wherein a standard deviation of eluted fractions of the polyethylene material 40° C., 50° C., 60° C., 70° C., 80° C., 90° C., 100° C., and 110° C. is in a range of 0% to 6.0%.

4. The polyethylene material according to claim 1, having a number-average lamella thickness in a range of 6 nm to 18 nm, a weight-average lamella thickness in a range of 8 nm to 20 nm, and a distribution coefficient of the lamella thickness is in a range of 1 to 1.333.

5. The polyethylene material according to claim 1, having a weight-average molecular weight in a range of 5000 to 350000, and a molecular weight distribution coefficient in a range of 2.0 to 15.0.

6. The polyethylene material according to claim 1, having:
a melt flow index, at 230° C. and 2.16 kg, in a range of 0.8 g/10 min to 2.0 g/10 min;
a tensile yield strength in a range of 15 MPa to 25 MPa;
an elongation at break in a range of 450% to 700%;
a falling dart impact strength in a range of 200 g to 260 g; and/or
a haze in a range of 6% to 18%.

7. The polyethylene material according to claim 1, wherein the polyethylene material is prepared in a single reactor.

8. The polyethylene material according to claim 7, wherein the polyethylene material is prepared in the single reactor by alternately conducting ethylene homopolymerization reaction and ethylene copolymerization reaction, or by alternately conducting different copolymerization reactions.

9. A method for preparing the polyethylene material according to claim 1,
comprising:
introducing a reaction material containing ethylene into a single reactor for polymerization reaction; and
intermittently adding a condensate containing a comonomer into the single reactor so that the polymerization reaction alternates between ethylene homopolymerization and ethylene copolymerization, or changes among a plurality of copolymerization reactions in the single reactor.

10. The method according to claim 9, wherein the polymerization reaction changes between ethylene homopolymerization and ethylene copolymerization at least once per hour, and/or
the polymerization reaction changes from a first copolymerization reaction to a second copolymerization at least once per hour.

11. The method according to claim 9, wherein each homopolymerization is carried out continuously for 3 min to 60 min, and each copolymerization reaction is carried out continuously for 5 min to 60 min.

12. The method according to claim 9, wherein the comonomer is selected from olefins containing less than 18 carbon atoms.

13. The method according to claim 9, wherein the condensate comprises at least one compound selected from the group consisting of $C_4$ to $C_7$ saturated linear or branched alkanes, and $C_4$ to $C_7$ cycloalkanes.

14. The method according to claim 9, further comprising introducing at least one ingredient selected from the group consisting of a promoter, an antistatic agent, a chain transfer agent, a molecular regulator, a condensing agent, and an inert gas into the single reactor.

15. The method according to claim 9, wherein the polymerization reaction is carried out at a pressure of 0.5 MPa to 10 MPa and a temperature of 40° C. to 150° C.

16. The polyethylene material according to claim 1, wherein the polyethylene material is a copolymer of ethylene/1-hexene, a random copolymer of ethylene/1-butene/1-hexene, or a random copolymer of ethylene/1-hexene/1-octene.

17. A polymeric film comprising the polyethylene material according to 1.

18. The polyethylene material according to claim 1, having an amount of eluted fraction at 40° C. in a range of 10.0 wt % to 25.0 wt % and a melting temperature in a range of 116° C. to 130° C.

19. The polyethylene material according to claim 1, having an amount of eluted fraction at 40° C. in a range of 9.9 wt % to 20.0 wt %, and an amount of eluted fraction at 110° C. in a range of 9.0 wt % to 18.0 wt %.

20. The polyethylene material according to claim 1, wherein a standard deviation in amounts of two eluted fractions, measured from 40° C. to 110° C. at an interval of 10° C., is in the range of 0.5% to 3.5%.

21. The polyethylene material according to claim 1, having a weight-average molecular weight in a range of 10000 to 250000 and a molecular weight distribution coefficient in a range of 2.5 to 6.0.

22. The polyethylene material according to claim 1, wherein the polyethylene material is prepared in a fluidized bed reactor.

23. The polyethylene material according to claim 8, wherein the polyethylene material is prepared by first conducting ethylene copolymerization reaction, and then alternately conducting ethylene homopolymerization reaction and ethylene copolymerization reaction or alternately conducting different copolymerization reactions.

24. The method according to claim 9, wherein the polymerization reaction changes between ethylene homopolymerization and ethylene copolymerization three times or more per hour, and/or the polymerization reaction changes amongst three or more different copolymerization reactions.

25. The method according to claim 9, wherein each homopolymerization is carried out continuously for 8 min to 20 min, and each copolymerization reaction is carried out continuously for 8 min to 20 min.

26. The method according to claim 9, wherein the comonomer is selected from butene, hexene, and octene.

27. The method according to claim 9, wherein the condensate comprises at least one compound selected from n-pentane, isopentane, hexane, and heptanes.

28. The method according to claim 9, wherein the polymerization reaction in the reactor is carried out at a pressure of 1.5 MPa to 5 MPa and at a temperature of 50° C. to 120° C.

29. The film according to claim 17, wherein the film is a retortable film, a high-transparency film, a barrier and protective film, a heat-seal film, a tag film, or a medical package film.

* * * * *